United States Patent
MacIntosh

(10) Patent No.: US 11,981,385 B2
(45) Date of Patent: May 14, 2024

(54) PORTABLE FISHING ROD BIKE MOUNT WITH INTEGRATED SAND SPIKE

(71) Applicant: Scott MacIntosh, Boston, MA (US)

(72) Inventor: Scott MacIntosh, Boston, MA (US)

(*) Notice: Subject to any disclaimer, the term of this patent is extended or adjusted under 35 U.S.C. 154(b) by 159 days.

(21) Appl. No.: 17/828,033

(22) Filed: May 31, 2022

(65) Prior Publication Data
US 2023/0382483 A1    Nov. 30, 2023

(51) Int. Cl.
*B62J 11/05* (2020.01)
*A01K 97/10* (2006.01)

(52) U.S. Cl.
CPC .............. *B62J 11/05* (2020.02); *A01K 97/10* (2013.01)

(58) Field of Classification Search
CPC ............ B62J 11/00; B62J 11/05; A01K 97/10
USPC ......................................... 224/922
See application file for complete search history.

(56) References Cited

U.S. PATENT DOCUMENTS

| | | | | |
|---|---|---|---|---|
| 2,241,183 A * | 5/1941 | Ceder | ..................... | A01K 97/10 43/23 |
| 2,597,157 A * | 5/1952 | Martino | ................. | A47G 25/08 126/30 |
| 2,704,412 A * | 3/1955 | Davis | ..................... | A01K 97/10 248/518 |
| 3,007,661 A * | 11/1961 | Knopf | ..................... | A01K 97/10 248/545 |
| 3,339,869 A * | 9/1967 | Andersen | ............... | A01K 97/10 248/156 |
| 4,012,861 A * | 3/1977 | Gellatly | .................. | A01K 97/11 43/15 |
| 4,093,171 A * | 6/1978 | Mengo, Sr. | ............ | A01K 97/10 248/314 |
| 4,372,072 A * | 2/1983 | Comeau | .................. | A01K 97/10 224/922 |
| 4,407,475 A * | 10/1983 | Gossage | ................ | A47B 37/04 108/5 |
| D347,678 S * | 6/1994 | McCann, Jr. | ................. | D22/148 |
| 6,273,391 B1 * | 8/2001 | Engolia | .................... | B62J 11/05 248/539 |
| 7,520,485 B1 * | 4/2009 | Giannetto | .............. | A01K 97/10 248/156 |
| 9,049,853 B1 * | 6/2015 | Bourget | .................. | A01K 97/12 |
| 10,906,604 B2 * | 2/2021 | Elfenbein | ................ | B62J 11/05 |
| 11,647,827 B2 * | 5/2023 | Stockton | ................... | A45F 3/44 248/156 |
| 2005/0145761 A1 * | 7/2005 | Wooten | ................. | E04H 17/263 248/156 |
| 2009/0250496 A1 * | 10/2009 | Freyberger | ............... | B62J 11/05 224/427 |
| 2020/0189680 A1 * | 6/2020 | Elfenbein | ................ | B62J 11/00 |
| 2021/0197912 A1 * | 7/2021 | Silfen | ........................ | B62J 9/30 |
| 2022/0055707 A1 * | 2/2022 | Megica, Jr. | ............. | B62J 11/05 |
| 2023/0382483 A1 * | 11/2023 | MacIntosh | ............. | A01K 97/10 |

* cited by examiner

*Primary Examiner* — Justin M Larson

(57) ABSTRACT

The present invention discloses a rigid frame that has a plurality of integrally connected support sections with multiple features of transportable fishing rod holder combined with a collapsible sand-spike, all of which can be easily attached to a bike's handlebar for transportation. The assembly provides an inexpensive method of producing the fishing rod holder of the invention from readily available materials, is sustainable and provides effectiveness over longer period of time.

6 Claims, 8 Drawing Sheets

PORTABLE FISHING ROD BIKE MOUNT WITH INTEGRATED SAND SPIKE

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

This invention relates to fishing rod holder and more specifically to a portable, adjustable, compact bike mountable fishing rod holder with integrated collapsible sand-spike and with mechanism for attaching accessories.

Description of the Related Art

Rod holders were initially used by fishermen while still fishing, but have also come to be utilized during trolling, drifting and even jigging, for example. Rod holders range from a forked stick embedded into the bank of a body of water to tubes which can be embedded into the bank of a body of water and to adjustable models mountable on fishing boats.

Ural E. Davis describes a FISHING ROD HOLDER in U.S. Pat. No. 2,704,412 which can be mounted onto a support standard embedded into the bank of a stream or clamped onto a boat, wherein the rod holder is comprised of a substantially semi-cylindrical cradle hinged to a tube which is to mounted onto the support standard. Davis's rod holder requires the use of a U-shaped clip to hold the fishing rod in the cradle.

Walter E. Knopf describes a FISHING ROD HOLDER in U.S. Pat. No. 3,007,661 having a ground insertable end portion, a rod support end portion and a cylindrical socket middle portion. Knopf s device is usable only after it has been inserted into the ground which may be difficult to do in some locations and is not usable in areas where there is no "ground" in which the rod holder can be inserted, such as a fishing pier.

Walter L. Gellatly's FISHING POLE HOLDER described in U.S. Pat. No. 4,012,861 has a tubular member for receiving the fishing rod handle, a support spike driven into the ground and a biasing device connected between the tubular member and the support spike which is capable of pivoting and thus assisting in setting a hook in a biting fish. Gellatly's device is usable only after it has been inserted into the ground which may be difficult to do in some locations and is not usable in areas where there is no "ground" in which the rod holder can be inserted, such as a boat dock.

The FISHING ROD HOLDER described by Alfred Mengo, Sr. in U.S. Pat. No. 4,093,171 has a tubular member into which a handle of a fishing rod can be inserted. The tubular member is attached to a bracket which can swivel at various angles vertically, wherein the bracket is pivotally attached to a base adapted to be mounted on the hull of a boat. Mengo's device is secured to the boat's hull by three screws and thus is not capable of being repositioned or moved to support a rod from the bank of a stream.

Joseph E. Comeau describes in U.S. Pat. No. 4,372,072 a FISHING ROD HOLDER HAVING DUAL MOUNTING CAPABILITIES so that the holder can be placed in the sand or mounted onto a bumper of a vehicle. Comeau's rod holder comprises a longitudinal tubular member having a reel accommodating slot, wherein the tubular member is secured to a spiked member containing an anchor plate. Also provided is a bracket assembly which mounts to a bumper of a vehicle and receives the rod holder. Comeau's device is intended to be used from the shore of a body of water and cannot be used on a fishing boat.

U.S. Pat. No. Des. 347,678 by William F. McCann and Daniel J. Dryna illustrates a COMBINED FISHING ROD HOLDER AND TROLLING BOARD intended for use on a trolling fishing boat, and is capable of using a looped wire type rod holder or a tubular rod holder. McCann et al.'s device is not capable of being used from the bank of a river.

There are numerous solutions that have been presented in prior art regarding portable fishing rods and holding accessories. However, carrying them along causes inconvenience in holding things. Moreover, there is portable fishing rod which provides multiple features. The current assembly provides an assembly which is used to hold a fishing rod while going to and from the beach. This invention provides a compact, transportable fishing rod holder combined with a collapsible sand-spike, all of which can be easily attached to a bike's handlebar for transportation.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The objective of the invention is to provide a portable Fishing Rod Bike Mount with Integrated Sand Spike.

More specifically, it is the principal object of this invention to provide a compact bike mountable fishing rod holder with integrated collapsible sand-spike.

The object of the invention is further to provide a collapsible sand-spike with mechanism for attaching accessories.

According to another aspect of the invention, it is also the objective of the invention to provide an assembly which provides fishing rod holders for assisting a fisherman which allow the fisherman to attend to other tasks or more than one fishing rod.

It is an object of the present invention to provide a fishing rod holder which is capable of being used from the shore as well as from a boat, is light in weight and easy to manufacture from various noncorrosive materials such as aluminum, galvanized pipe, pvc pipe, etc.

A further aspect is to provide unique visual properties that are functional and aesthetically pleasing.

Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
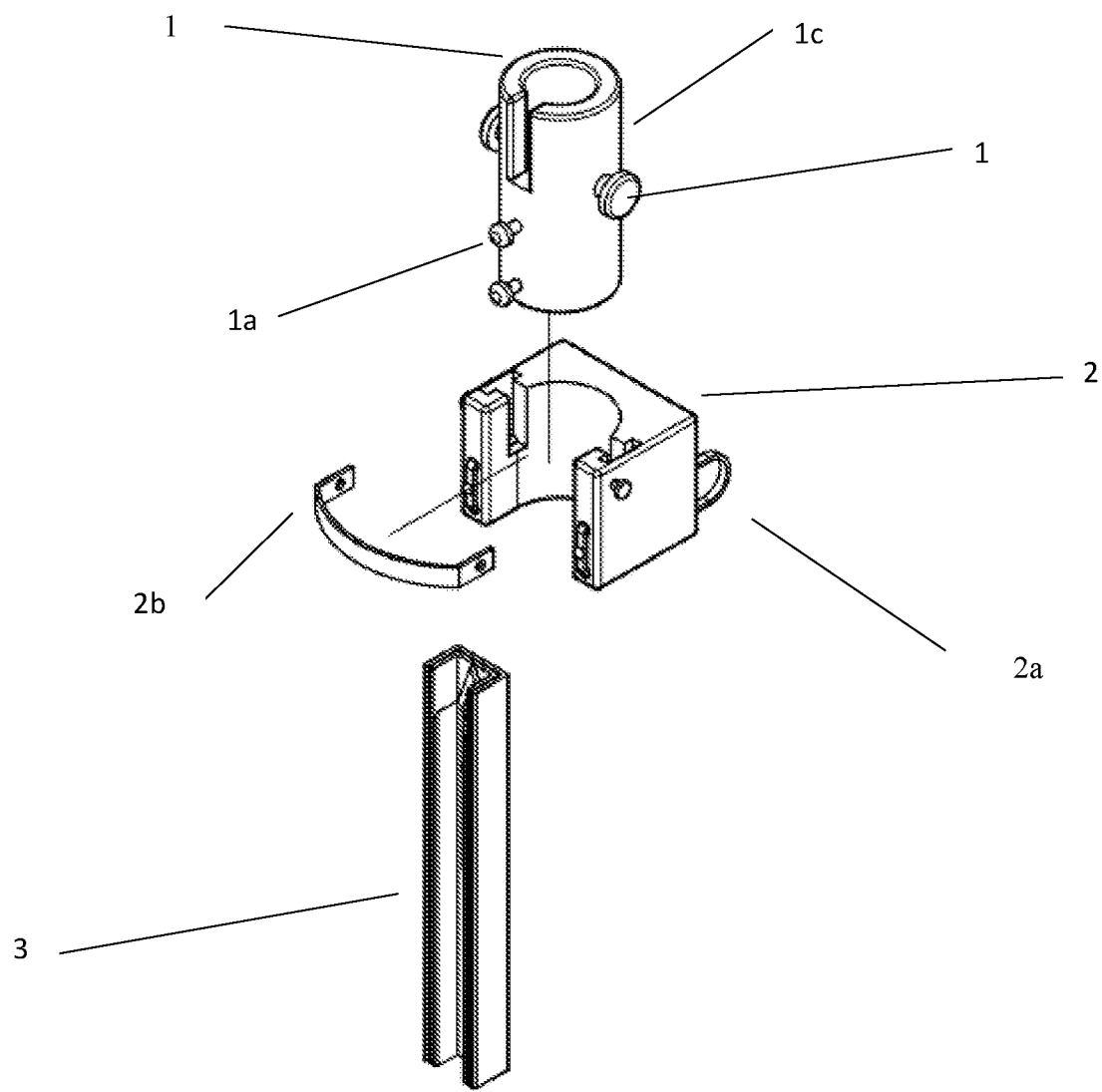
FIG. 1 discloses the exploded view of the main components of the Portable Fishing Rod Bike Mount with Integrate Sand Spike which includes items as per preferred embodiments of the invention.
Figure 2:
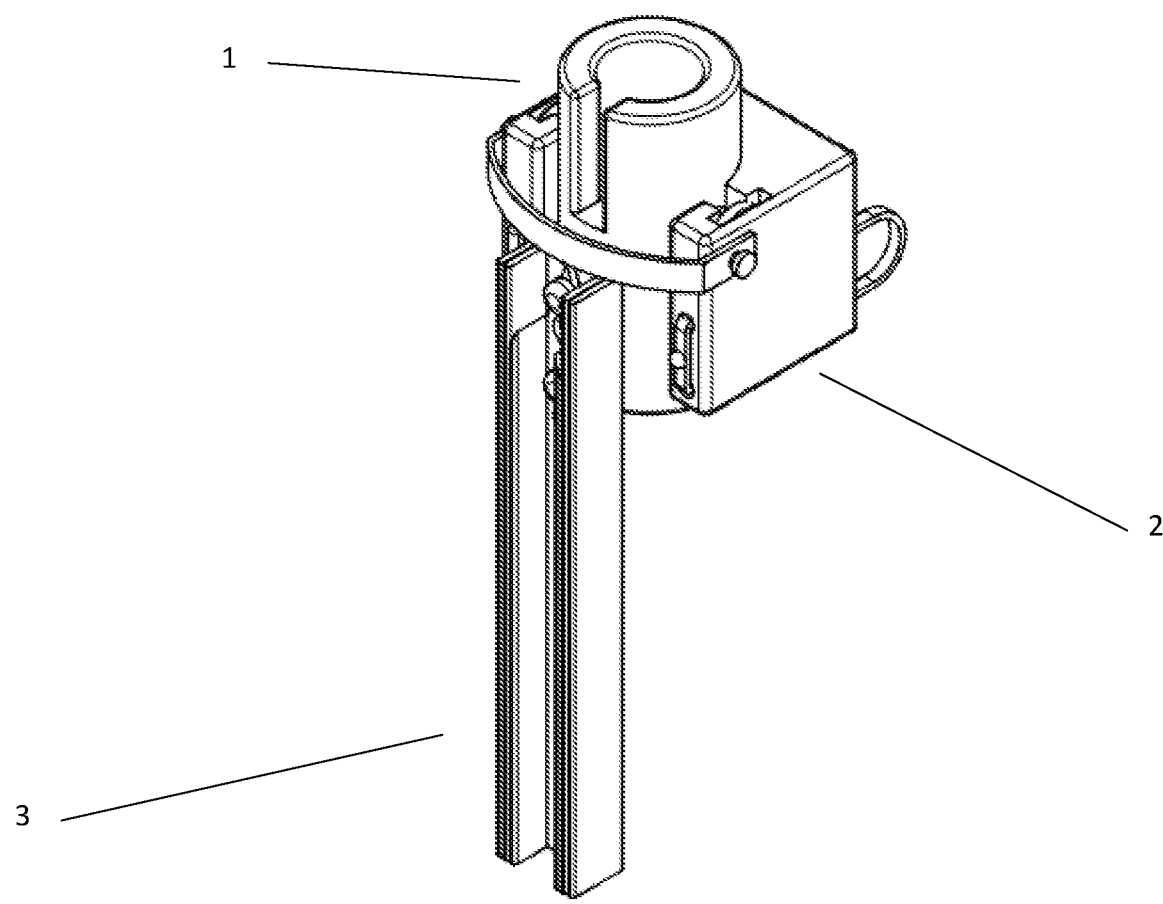
FIG. 2 shows fishing rod holder fixture (1) and bike mount fixture (2) and collapsible sand-spike (3) assembled for mounting on a bike handlebar as per preferred embodiments of the invention.
Figure 3:
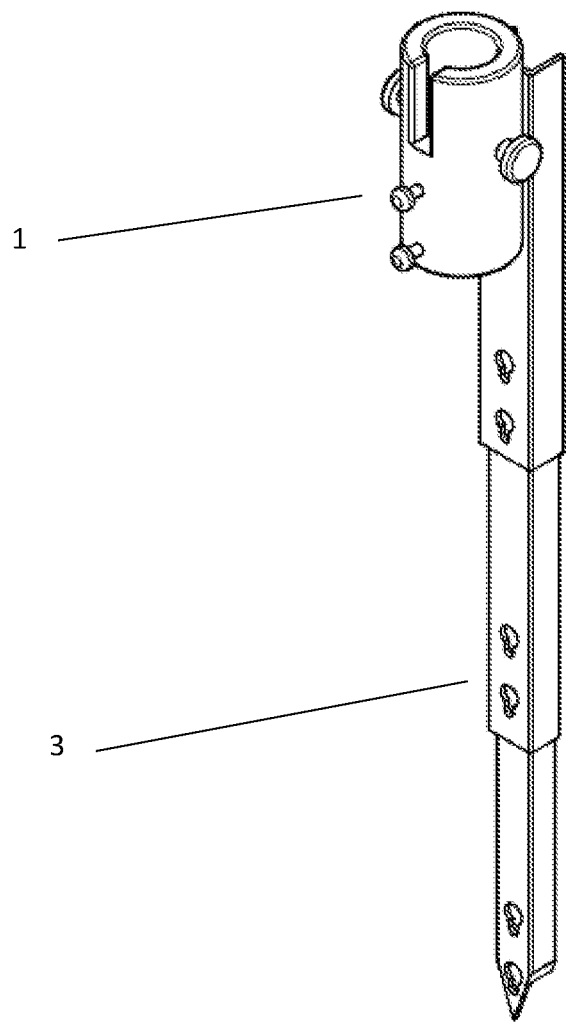
FIG. 3 shows fishing rod holder fixture (1) and collapsible sand-spike (3) extended and assembled for deployment at a beach as per preferred embodiments of the invention.
Figure 4:
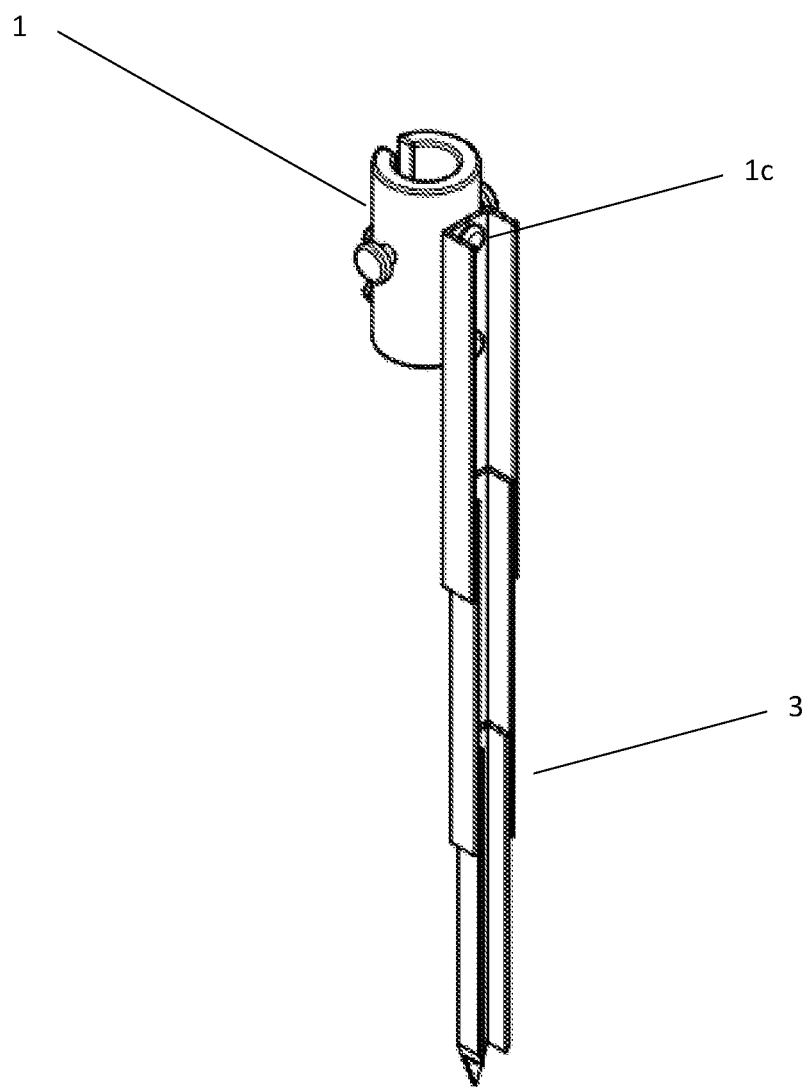
FIG. 4 fishing rod holder fixture (1) and collapsible sand-spike (3) extended and assembled for deployment at a beach held by a screw in mounting holes (1c) as per preferred embodiments of the invention.
Figure 5:
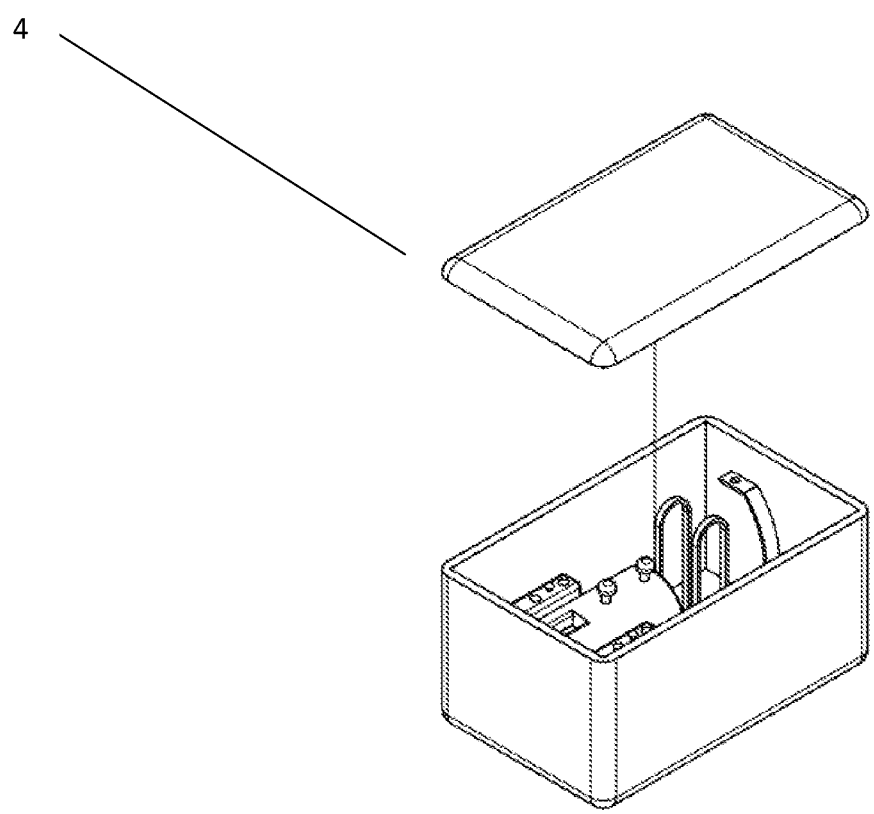
FIG. 5 shows the unassembled components for Portable Fishing Rod Bike Mount with Integrate Sand Spike placed in small container (4) small enough to fit in a TSA approved carried on luggage. as per preferred embodiments of the invention.
Figure 6:
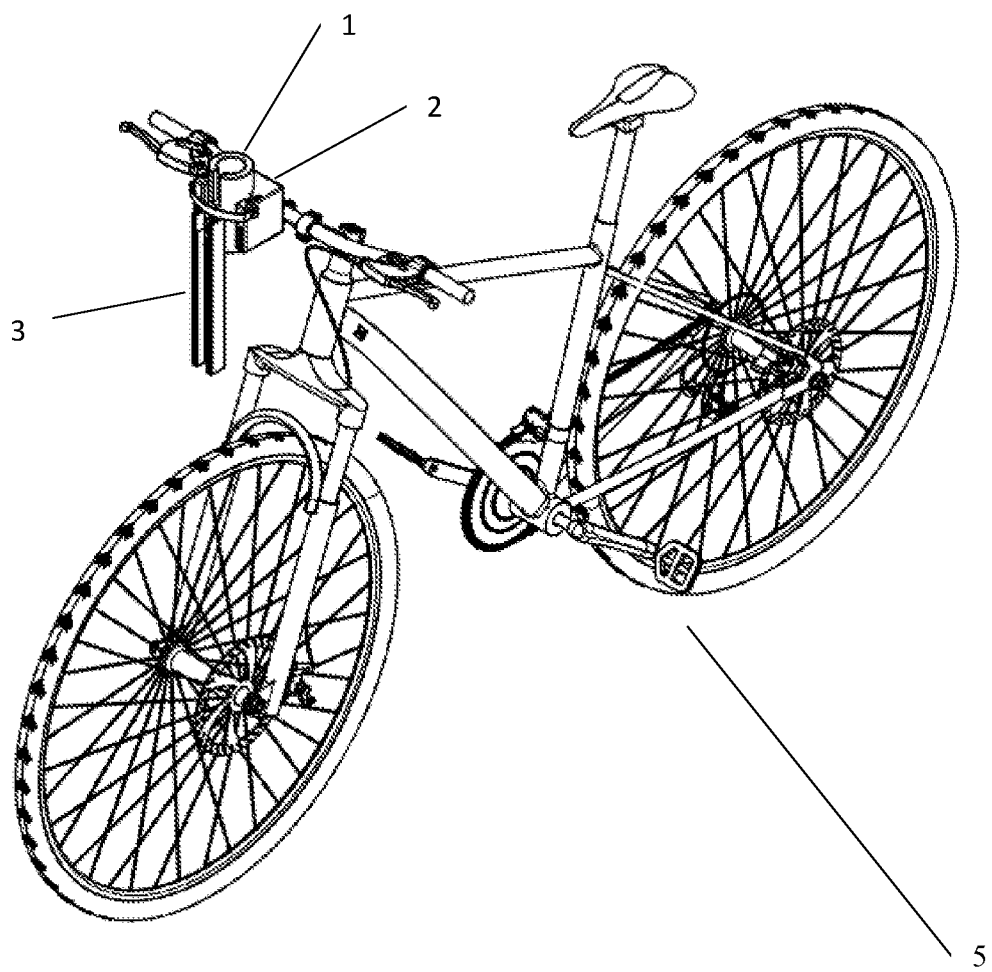
FIG. 6 shows fishing rod holder fixture (1) and bike mount fixture (2) and collapsible sand-spike (3) assembled for mounting on a bike handlebar, mounted on a bike's (5) handlebar as per preferred embodiments of the invention.
Figure 7:
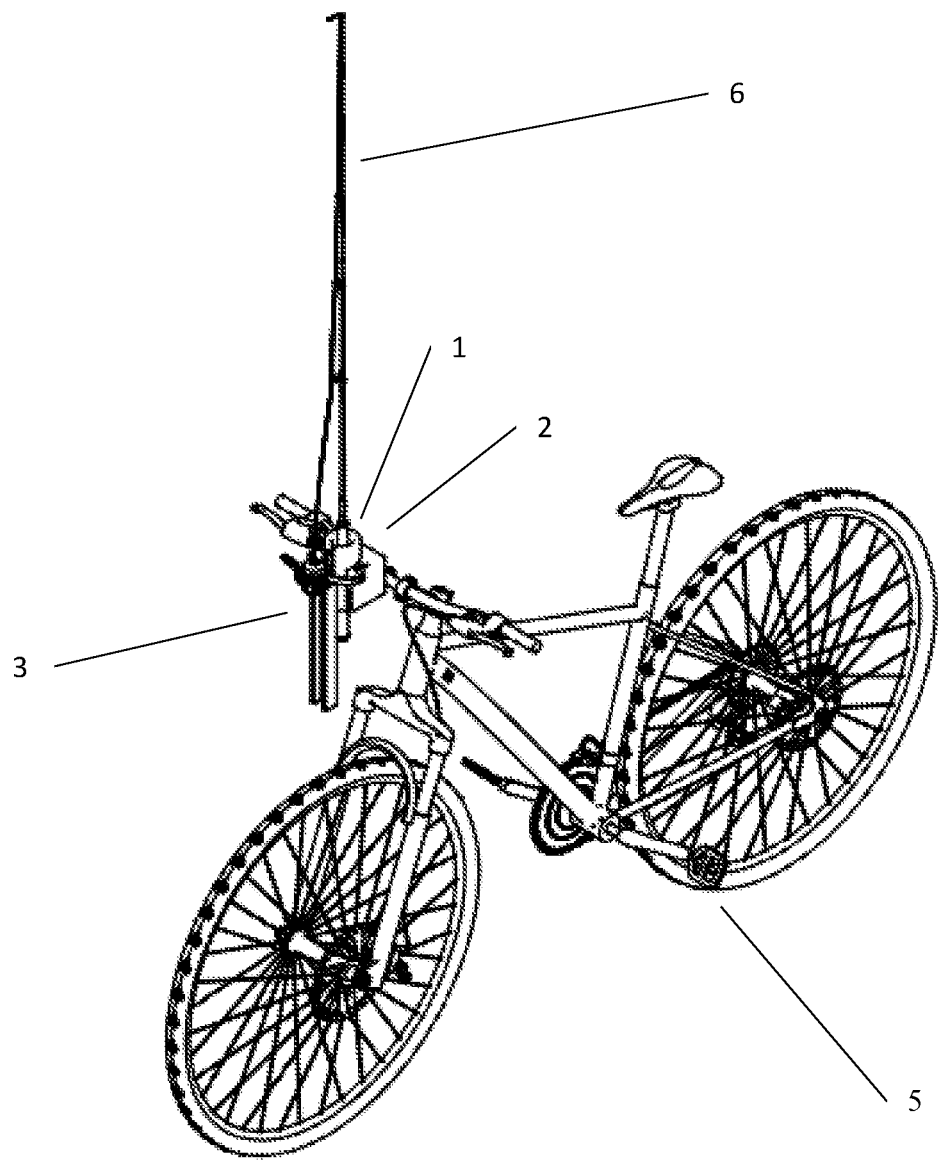
FIG. 7 shows the fishing rod holder fixture (1) and bike mount fixture (2) and collapsible sand-spike (3) assembled for mounting on a bike handlebar, mounted on a bike's (5) handlebar with fishing rod (6) secured in fishing rod holder fixture (1) as per preferred embodiments of the invention.
Figure 8:
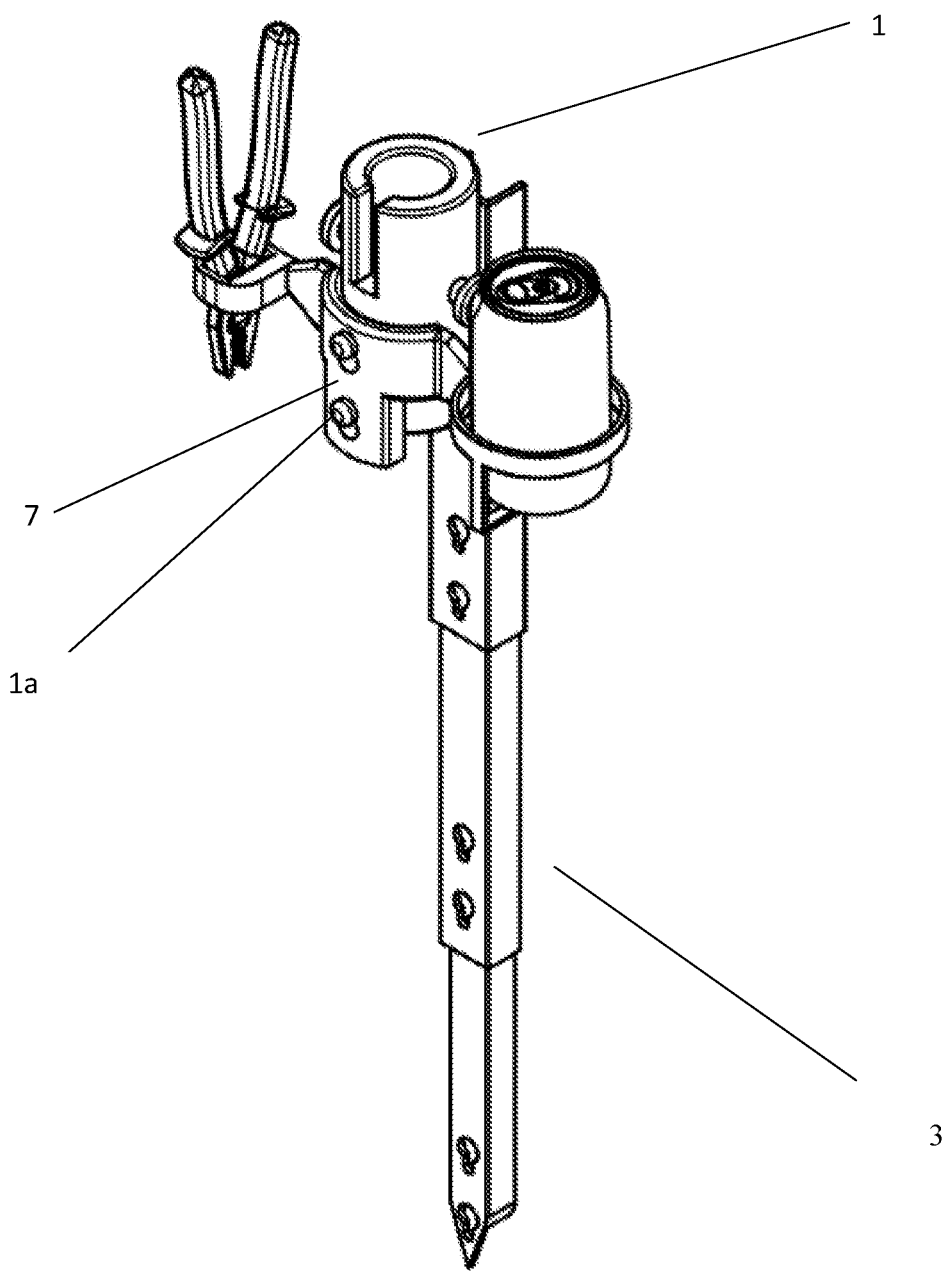
FIG. 8 shows the fishing rod holder fixture (1) and collapsible sand-spike (3) extended and assembled for deployment at a beach with example accessory (7) attached to posts (la) as per preferred embodiments of the invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to a portable fishing rod bike mount with integrated sand spike.

Typically, a typical piece of equipment used by people who fish from the beach is a fishing rod holder, also known as a sand-spike which can be placed in the sand to hold a fishing rod. Additionally, many people will travel to and from the beach by bike and will use an add-on piece of equipment to the bike which is used to hold a fishing rod while going to and from the beach. For people who enjoy fishing when travelling and who like to use a bicycle to transport their fishing equipment to and from the beach there are little options for bicycle fishing rod holders or sand-spikes which can easily be packed onto a standard TSA approved carry-on bag.

The present invention presents a unique type of holder for fishing rods, which, in addition to supporting the rod, is useful for combining with a collapsible sand-spike, and can be easily attached to a bike's handlebar for transportation.

The assembly provide an improved fishing rod holder which is capable of quickly pivoting or snapping a fishing rod in order to set a fish hook, which device overcomes the various problems encountered in prior art devices of the same general type. It provides a fishing rod holder which employs a release mechanism capable of being adjusted as to the amount of tension needed to actuate the mechanism, so that it can be used under a wide variety of conditions.

The assembly provides a fishing rod holder which is capable of holding most types of fishing poles and which allows such poles to be easily placed in and removed from the device.

The assembly as per its further embodiments provides a fishing rod holder which is made from high quality material and is sustainable and provides same efficiency level over longer period of time.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for mounting a fishing rod holder and sand spike to a bicycle, comprising:
   a fishing rod holder with attachment features;
   a collapsible sand spike removably attachable to the fishing rod holder; and
   a bike mount fixture; wherein the attachment features secure the fishing rod holder within the bike mount fixture.

2. The apparatus of claim 1, wherein the attachment features also allow a user to attach accessories to the fishing rod holder.

3. The apparatus of claim 1, wherein the attachment features are posts.

4. The apparatus of claim 1, wherein the collapsible sand spike is removably attachable to both a front and a rear of the fishing rod holder.

5. The apparatus of claim 1, where a rubber strap is used to further secure the fishing rod holder to the bike mount fixture.

6. The apparatus of claim 1, wherein rubber straps are used to secure the bike mount fixture to a handlebar of the bicycle.

* * * * *